United States Patent [19]

Woltermann

[11] 4,454,244

[45] Jun. 12, 1984

[54] NEW COMPOSITIONS

[75] Inventor: Gerald M. Woltermann, Dublin, Ohio

[73] Assignee: Ashland Oil, Inc., Ashland, Ky.

[21] Appl. No.: 479,418

[22] Filed: Mar. 28, 1983

[51] Int. Cl.³ .................. B01J 27/14; B01J 21/02; B01J 27/02; B01J 23/10

[52] U.S. Cl. .................... 502/208; 502/202; 502/209; 502/210; 502/211; 502/215; 502/305; 502/311; 502/312; 502/313; 423/593; 423/594; 423/595; 423/596; 423/599; 423/600; 423/601; 423/306; 423/417

[58] Field of Search .............. 252/410, 432, 435, 437, 252/439, 462, 464, 465, 466 B, 468; 423/593, 594, 595, 596, 599, 600, 601, 306, 417

[56] References Cited

U.S. PATENT DOCUMENTS

| | | | |
|---|---|---|---|
| 3,326,817 | 6/1967 | Callahan et al. | 252/437 X |
| 3,879,523 | 4/1975 | Miyata et al. | 423/595 X |
| 3,879,525 | 4/1975 | Miyata et al. | 423/595 X |
| 3,885,020 | 5/1975 | Whelan | 252/462 X |
| 3,907,715 | 9/1975 | Arai et al. | 252/466 B X |
| 3,929,670 | 12/1975 | Kudo et al. | 252/462 X |
| 3,976,599 | 8/1976 | Whelan | 252/465 X |
| 4,009,124 | 2/1977 | Laurer et al. | 423/600 X |
| 4,059,679 | 11/1977 | Clearfield | 252/437 X |
| 4,238,364 | 12/1980 | Shoblai | 252/435 Z X |
| 4,248,739 | 2/1981 | Vaughan et al. | 252/455 R |
| 4,392,980 | 7/1983 | Lee et al. | 423/600 X |
| 4,392,984 | 7/1983 | Englbach et al. | 252/435 X |

*Primary Examiner*—Delbert E. Gantz
*Assistant Examiner*—William G. Wright
*Attorney, Agent, or Firm*—John F. Jones

[57] ABSTRACT

Compositions conforming to the formula $A_x^{++}B_y^{+++}(OH)_{2x+3y-nz}D_z^{n-} \cdot tH_2O$ wherein A is a divalent metal, B is a trivalent metal, D is a polyanion, x, y, z and t are numbers greater than zero and n is a whole number preferably from 1 to 10 and the ratio of x:y is equal to or greater than 0.5 and less than or equal to 10 and a method for preparing said compositions are described.

18 Claims, No Drawings

NEW COMPOSITIONS

This invention relates to a new class of synthetic minerals and particularly pertains to expanded layered minerals which have been exchanged with polyanions and to methods for preparing them.

The pillaring of clay such as montmorillonite or bentonite by certain cationic clusters in order to produce an expanded interlaminar region useful for heavy oil cracking is described in U.S. Pat. Nos. 4,238,364 and 4,248,739, for instance. A discussion of the differences between molecular seives (cage-like), which are also known as zeolites, when compared with cross-linked smectites (montmorillonite, hectorite, and synthetic fluorhectorites which are ion-exchanged with small globular cations, e.g., tetramethyl ammonium and ethylene diammonium ions) appears in an article by Shabtai, in *La Chimica e L'industria*, v. 61, n. 10., October 1979. The exchange of some small anions with double layer structures having brucite-like layers ions is described by Allman in *Chimia*, 24, 99(1970) and the exchange of hydrotalcite [$Mg_6Al_2(OH)_{16}.CO_3.4H_2O$] with anions such as $Cl^-$, $NO_3^-$, $CO_3^{--}$, oxalic acid and salicylic acid is described in *Clay and Clay Minerals*, 26, 441(1978); 28, 50(1980) and in *Clay Minerals*, 7, 193(1967).

Much of the prior art relates to layered silicates which are cation exchanged. The use of layered silicates greatly limits the variety of materials possible in the smectic framework and cation exchange limits to a significant degree the kind of elements which can be used in the exchange reaction with the smectic backbone structure. Workers who have used other than layered silicates have failed to utilize the expandable nature of these materials by exchanging them with large polyanion cluster materials.

I have discovered a new class of compounds which are the products of anion exchange reactions between certain layered (smectic) minerals and large metal cluster anions also called polyanions wherein the smectic mineral conforms to the formula $A_x^{++}B_y^{+++}(OH)_{2x+3y-nz}C_z^{n-}.tH_2O$ wherein A is a divalent metal, B is a trivalent metal, C is an anion such as $NO_3^-$, $Cl^-$, $ClO_4^-$, $CO_3^{--}$, etc., x, y, z and t are numbers greater than zero, n is a whole number preferably from 1–10 and the ratio x:y is equal to or greater than 0.5 and less than or equal to 10; and wherein the large metal cluster anion is a polyanion which is composed of metal and/or non-metal atoms arranged in a network having a net negative charge. I have also discovered a process for making this new class of compounds. The new compounds of my invention are useful in ion-exchange reactions and they can be used as catalysts for the combustion of hydrocarbons and/or other air pollutants such as sulfur oxides and nitrogen oxides. Because of their high surface area (which can vary from 5 to 250 $M^2/g$, BET, or higher and preferably from 30 to 250 $M^2/g$) and large variety of components and what is believed to be a layered structure, the compounds of my invention are also useful catalysts for hydrocarbon conversion processes such as hydrodesulfurization, denitrification, catalytic cracking, hydrocracking, and the like.

The preferred layered or smectic materials for use as substrates in the preparation of the compounds embodied in my invention are those conforming to the formula $A_x^{++}B_y^{+++}(OH)_{2x+3y-nz}C_z^{n-}.tH_2O$ wherein A is at least one member selected from the group consisting of copper, calcium, zinc, cobalt, iron, cadmium, mercury, lead, manganese, magnesium, tin, strontium, barium, nickel, platinum and palladium; B is at least one member selected from the group consisting of aluminum, iron, antimony, indium, chromium, cobalt, lanthanum and the other rare earths, ruthenium, rhodium, and bismuth; and C is an anion such as $NO_3^-$, $Cl^-$, $CO_3^{2-}$, $SO_4^{--}$ etc., and x,y,z,n and t have the earlier mentioned designations. The preferred polyanion for exchange with the smectic material is at least one selected from the group consisting of $Ta_6O_{18}OH^{-7}$, $Nb_6O_{18}OH^{-7}$, $V_{10}O_{28}^{-6}$, $PMo_6V_6O_{40}^{-3}$, $PMo_6W_6O_{40}^{-3}$, $P_3O_{10}^{-5}$, $PMo_{12}O_{40}^{-3}$, $Mo_7O_{24}^{-6}$, $NiW_6O_{24}H_6^{-4}$, $As_2Mo_{18}O_{62}^{-6}$, $TeMo_6O_{24}^{-6}$, $PMo_{10}V_2O_{40}^{-5}$, $CoW_{12}O_{40}^{-6}$, $B_3O_3(OH)_4^-$, $B_5O_8^-$, $B_{10}H_{10}^{-2}$, $B_{11}C_2H_{12}$, $Pt_{18}(CO)_{36}^{-2}$, $Rh_6(CO)_{15}^{-2}$, $Re_3Cl_{12}^{-3}$, $Ni_3Cr_2(CO)_{16}^{-2}$, $H_3Ru_4(CO)_{12}^-$, $HRe_3(CO)_{12}^{-2}$, $HFe_4(CO)_{13}^-$ and the like. A particularly preferred group of polyanions are the heteropoly anions including those discussed in the bulletin entitled "Heteropoly Compounds of Molybdenum and Tungsten", by George A. Tsigdinos, Climax Molybdenum Co., Bulletin Cdb-12a, Nov. 1969. See also *Chemical And Engineering News*, Aug. 30, 1982, pp. 28–41 and *Topics in Current Chemistry*, Vol. 76, pp 1–64, Springer-Verlag, 1978.

The preferred compositions of this invention are those conforming to the formula $A_x^{++}B_y^{+++}(OH)_{2x+3y-nz}D_z^{n-}.tH_2O$ wherein A, B, x,y,z,n and t have the aforementioned designations and D is a polyanion as designated above.

In general, the smectic mineral material is prepared by slurrying or by a precipitation method. In the slurry procedure, for instance, the divalent metal (A) oxide in water and one-half the stoichiometric amount of trivalent metal (B) ion is added to the slurry. The slurry is then heated for a time, filtered and washed. The resulting solid is reslurried and the other half of the trivalent metal ion is added to the slurry which is also heated, filtered and washed followed by drying.

The exchange reaction is carried out by slurrying the smectic mineral material in water or a non-aqueous solvent which contains the dissolved metal cluster polyanion. The exchange procedure can be done in more than one step if desired.

The polyanion exchanged smectic materials of this invention are useful per se or they may be calcined before use as catalysts for the oxidation of methane, sulfur oxides, nitrogen oxides, etc., preferably at a temperature in the range of from 100° to 1000° C. and preferably from about 300° to about 600° C. in air, other oxygen containing gases or in an inert, oxygen free atmosphere such as in nitrogen or in a reducing atmosphere such as hydrogen for from a few minutes to several hours or more.

The compositions and process of this invention are further illustrated in the following examples.

EXAMPLE 1

A slurry of 90 g. of zinc oxide was prepared in 50 g. of deionized water. To this slurry was added 308 ml of 1 M solution of $Al(NO_3)_3.6H_2O$ in water and the pH was adjusted with water to 3.6–4.0. The slurry was heated with stirring for six hours at 90° C. The solid was isolated by filtration and was washed with deionized water. The solid was then reslurried in 100 g. of deionized water and 308 ml of 1 M solution of $Al(NO_3)_3.6H_2O$ in water was added to the slurry. Again the pH of the slurry was adjusted to 3.6 to 4.0 with water and the slurry was maintained at 90° C. overnight. The resulting very thick slurry was then filtered and washed thoroughly with deionized water and the solid was dried at 110°–120° C. overnight. The X-Ray diffraction analysis of this solid showed a pattern consistent with the hydrotalcite type of layered mineral $Zn_xAl_y(OH)_{2x+3y-nz} \cdot z(NO_3) \cdot tH_2O$.

EXAMPLE 2

A slurry of 90 g. of zinc oxide in 50 g. of water was prepared and to this was added 308 ml of 1 M solution of $Cr(NO_3)_3 \cdot 9H_2O$. The pH of the mixture was between 3.6 and 4.0. This mixture was heated at 90° C. with stirring for six hours. The resulting purple solid was collected by filtration and was washed thoroughly with deionized water. The solid was then reslurried in 100 g. of water. To this slurry was added 380 ml of 1 M chromium nitrate solution and the pH was adjusted to 3.6–4.0 with water. This mixture was stirred for six hours at 90° C. and the solid was collected by filtration and was washed with large amounts of water. The resulting solid was dried overnight at 110°–120° C. The X-Ray diffraction pattern of the dried solid was found to agree with a layered material of the form $Zn_xCr_y(OH)_{2x+3y-nz} \cdot z(NO_3) \cdot tH_2O$.

EXAMPLE 3

A solution was prepared by dissolving 247.6 g. of $Al(NO_3)_3 \cdot 9H_2O$ and 366.7 g. of $Zn(NO_3)_2 \cdot H_2O$ (30.8% $H_2O$) in enough water to make 2 l. of solution. A second solution of 160 g. of NaOH in enough water to make 2 l. of solution was also prepared. The two solutions were then mixed by dropwise addition of both to a container and the addition was done in such a manner than the pH of the resulting mixture was maintained at about 10. The resulting white solid material in the mixture was isolated by filtration, was washed with large amounts of water and was dried overnight at 110°–120°. The dried solid was ground and reslurried in 500 g. of water to remove traces of $NaNO_3$. The slurry was stirred at 30° C. for an hour and the solid was then collected by filtration and was washed with water and dried overnight at 110°–120° C. X-Ray diffraction analysis of this solid showed a hydrotalcite type material, $Zn_xAl_y(OH)_{2x+3y-nz} \cdot z(NO_3) \cdot tH_2O$.

EXAMPLE 4

A 2 molar solution of NaOH in water and a solution of 0.67 molar $Zn(NO_3)_2$ and 0.33 molar $Cr(NO_3)_3$ were prepared as in Example 3. The two solutions were mixed as in Example 3 in such a manner as to maintain the pH of the resulting mixture at about 10. The resulting purple solid was collected by filtration and was washed with large amounts of water. The solid was dried overnight at 110°–120° C. The dried solid was ground, reslurried in 500 g. of water and stirred at 30° C. for two hours. The solid was then collected by filtration, washed with a large amount of water and dried overnight at 110°–120° C. The X-Ray diffraction pattern of the dried solid showed it to have a hydrotalcite structure $Zn_xCr_y(OH)_{2x+3y-nz} \cdot z(NO_3) \cdot tH_2O$.

EXAMPLE 5

15 g. of the material prepared in Example 1 was slurried in 100 ml of an aqueous solution containing 10 g. of 12-heteropoly phosphomolybdic acid. The exchange was carried out for 45 minutes at 80°–90° C. and the yellow solution became colorless during that time. The resulting yellow solid was collected by filtration, was washed with large increments of water and was resubjected to the same exchange procedure described above once again. The final yellow solid was dried at 110°–120° C. overnight. The dried solid was calcined in air at 300° C. for two hours. A sample of the material prepared according to the procedure of Example 1 which had not undergone the exchange reaction was also calcined at 300° C. for two hours. The two calcined materials were then analyzed for surface area and chemisorptive properties. The material which had been exchanged with the 12-heteropoly phosphomolybdic acid showed a BET surface area of 89.2 $M^2/g$. and showed a $N_2$ absorption of 40 mg/g. of absorbent and a neopentane absorbance of 30 mg/g. of absorbent. On the other hand, the calcined, non-exchanged hydrotalcite material showed a BET surface area of less than 1 $M^2/g$. and no significant absorption of either $N_2$ or neopentane.

EXAMPLE 6

A 15 g. sample of the material prepared in Example 2 was subjected to the same exchange procedure described in Example 5. The exchanged material was calcined at 300° C. for two hours and similarly a sample of the unexchanged material from Example 2 was also calcined in the same way. The calcined, exchanged material was found to have a BET surface area of 69.1 $M^2/g$. and typical Langmuir isotherms of 24 mg/g. of $N_2$ and 20 mg/g. of neopentane per gram of absorbent whereas the calcined, unexchanged hydrotalcite material had a BET surface area of less than 1 $M^2/g$. and showed no appreciable absorption.

EXAMPLE 7

A slurry of 30 g. of $NH_4VO_3$ in 100 ml of water was stirred at 50°–60° C. overnight. The solid was separated by filtration and the remaining yellow solution was slurried with 20 g. of the solid prepared in Example 1. (The yellow solution has a pH of about 5 and contained $V_{10}O_{28}^{6-}$ ions.) The slurry was stirred at 90° C. for one hour and the resulting yellow solid was collected by filtration, was washed with water and exchanged as above twice more. The final solid product was dried overnight at 110°–120° C. and then was calcined at 300° C. for two hours. The resulting solid was found to have a BET surface area of 169.2 $M^2/g$.

EXAMPLE 8

A mixture of 4 g. of $Nb_2O_5$ and 3 g. of KOH was heated overnight in a platinum crucible at 600° C. The cooled solid was stirred in 50 g. of water for 30 minutes and the mixture was filtered. The solid was discarded and the filtrate was heated at reduced pressure to remove water. The remaining solid was dissolved in about 5–8 g. of water and to the resulting clear solution was added 20 g. of absolute ethanol. The white precipitate which formed was isolated by filtration and was dried. The dried material was found by analysis to be $K_7Nb_6O_{18}OH$.

A solution of 5.5 g. of the material described just above was prepared in 100 ml of water and to this solution was added 20 g. of the material prepared according to Example 1. The resulting slurry was heated to 95° C. and stirred at this temperature for one hour. The resulting purple solid was collected by filtration and was washed with large amounts of water. The solid was dried at 110°–120° C. overnight. After calcining at 300°

C. for two hours the solid exhibited a BET surface area of 108.4 $M^2/g$.

EXAMPLE 9

A slurry was prepared from 12 g. of the material prepared according to Example 4, 7 g. of 12-heteropoly phosphomolybdic acid and 50 ml of water. The slurry was stirred for thirty minutes at 90° C. and the resulting green insoluble solid was collected by filtration and was washed with a large excess of water. The exchange procedure described just above was repeated on the green solid twice more and the final solid product was washed, dried and calcined at 300° C. for two hours.

EXAMPLE 10

A mixture of 5 g. of zinc oxide, 12 g. of 12-heteropoly phosphomolybdic acid and 6.8 g. of $Cr(NO_3)_3.9H_2O$ in 50 ml of water was stirred at 100° C. until the water had evaporated. The residual solid was then dried overnight at 110°-120° C. and finally was calcined at 300° C. for two hours. This material, which is outside the scope of this invention was found to have a BET surface area of 5 $M^2/g$. This material was made for the purpose of comparison with the materials embodied in this invention.

EXAMPLE 11

A mixture which was made up of 5 g. of ZnO, 12 g. of 12 heteropoly phosphomolybdic acid and 6.8 g. of $Cr(NO_3)_3.9H_2O$ and 50 ml of water was stirred at 80° C. for an hour, the solid was isolated, washed and calcined as in Example 10. The final solid which is outside the scope of this invention was found by analysis to have a BET surface area of 7.9 $M^2/g$.

EXAMPLE 12

Materials described in Examples 2, 4, 6, 9, 10 and 11 were tested in the form of 12–20 mesh particles as catalysts for the oxidation of methane. Each of the catalysts (3.3 g.) which had been calcined in air at 300° C. for two hours was first diluted with from 3–10 g. of quartz chips (12–20 mesh) and the oxidation reactions were run in a small fixed bed tube reactor at ambient pressure. The feed to the reactor was a mixture of 80% by volume air and 20% methane and in each case the weight hourly space velocity was about 10 $hr^{-1}$. Effluent gases from the reactor (methane, $CO_2$ and CO) were analyzed by gas chromatograph and the conversion of methane to carbon oxides are given in the Table I.

TABLE I

| Catalyst from Example | Reaction Temp. ° C. | % $CH_4$ Conversion |
| --- | --- | --- |
| 2 | 580 | Less than 1 |
| 4 | 580 | Less than 1 |
| 6 | 580 | 18.3 |
| 9 | 580 | 16.68 |
| 10 | 580 | Less than 1 |
| 11 | 580 | Less than 1 |

EXAMPLE 13

Some of the material prepared according to Example 2 (12 g.) was slurried in a solution of 7.0 g. of 12-heteropoly phosphomolybdic acid in methanol and the slurry was stirred and heated at 55° C. for one-half hour. During this time the solution became colorless. The resulting insoluble solid was collected by filtration and was washed with 100 ml of methanol. The solid product was reslurried in a solution of 12.0 g. of the heteropoly acid in methanol and the slurry was stirred at 60° C. for two and one-half hours. The solid was collected by filtration, washed with 100 ml of methanol and a large amount of water and was dried at 110° C.

EXAMPLE 14

The procedure of Example 13 was followed using the materials described in Example 4.

EXAMPLE 15

In accordance with the procedures of Examples 1 and 3 a number of hydrotalcite-like smectic materials were prepared and in some cases the surface area was determined by the BET method after calcination at 300° C. The materials prepared and results obtained are shown in Table 2.

TABLE 2

| A | B | C | Surface Area (BET) |
| --- | --- | --- | --- |
| Zn | Al | $NO_3^-$; $Cl^-$ | Less than 1 $M^2/g$. |
| Zn | Cr | $NO_3^-$; $Cl^-$ | " |
| Zn | Fe | $NO_3^-$ | " |
| Cu | Al | $NO_3^-$ | " |
| Cu | Cr | $NO_3^-$ | Not Determined |
| Cu | Fe | $NO_3^-$ | " |
| Ni | Al | $NO_3^-$ | " |
| Cd | Al | $NO_3^-$ | Less than 1 $M^2/g$. |
| Cd | Cr | $NO_3^-$ | Not Determined |
| Mg | Al | $NO_3^-$ | Less than 1 $M^2/g$. |
| Ca | Al | $NO_3^-$ | " |
| Co | Cr | $NO_3^-$ | Not Determined |
| Co | Al | $NO_3^-$ | " |
| Mn | Al | $NO_3^-$ | " |
| Sn | Al | $NO_3^-$ | " |

EXAMPLE 17

Several hydrotalcite like materials of the type described in Example 16 and Table 2 were exchanged with polyanions by procedures given in Example 3. The calcined exchanged materials which are embodied in this invention were found to have high surface areas (BET) in all cases in which surface area was determined. The materials used and results obtained are given in Table 3.

TABLE 3

| A | B | D | Surface Area, $M^2/g$. |
| --- | --- | --- | --- |
| Zn | Al | $Ta_6O_{18}(OH)^{-7}$ | 140.6 |
| Zn | Al | $Nb_6O_{18}(OH)^{-7}$ | 95.0 |
| Zn | Al | $V_{10}O_{28}^{-6}$ | 169.2 |
| Zn | Al | $PMo_{12}O_{40}^{-3}$ | 89.2 |
| Zn | Al | $PW_{12}O_{40}^{-3}$ | 85.4 |
| Zn | Al | $PMo_6W_6O_{40}^{-3}$ | 91.0 |
| Zn | Al | $PMo_6V_6O_{40}^{-5}$ | 78.2 |
| Zn | Al | $Mo_7O_{24}^{-6}$ | — |
| Zn | Cr | $Ta_6O_{18}(OH)^{-7}$ | 122.3 |
| Zn | Cr | $Nb_6O_{18}(OH)^{-7}$ | 108.4 |
| Zn | Cr | $PMo_6W_6O_{40}^{-3}$ | 80 |
| Zn | Cr | $PMo_6V_6O_{40}^{-5}$ | 115 |
| Zn | Cr | $Mo_7O_{24}^{-6}$ | — |
| Zn | Cr | $PMo_{12}O_{40}^{-3}$ | 69.1 |
| Mg | Al | $Mo_7O_{24}^{-6}$ | 71.5 |
| Mg | Al | $PMo_6V_6O_{40}^{-5}$ | 92.2 |
| Mg | Al | $V_{10}O_{28}^{-6}$ | — |
| Cd | Al | $PMo_{12}O_{40}^{-3}$ | 85 |
| Cu | Al | $V_{10}O_{28}^{-6}$ | — |
| Cu | Al | $Mo_7O_{24}^{-6}$ | — |
| Cu | Cr | $V_{10}O_{28}^{-6}$ | — |
| Cu | Cr | $Mo_7O_{24}^{-6}$ | — |
| Co | Al | $PMo_6V_6O_{40}^{-5}$ | 48 |
| Co | Al | $V_{10}O_{28}^{-5}$ | — |
| Co | Al | $Mo_7O_{24}^{-6}$ | — |
| Ca | Al | $PMo_6V_6O_{40}^{-5}$ | 133 |

TABLE 3-continued

| A  | B  | D                  | Surface Area, $M^2/g$. |
|----|----|--------------------|------------------------|
| Mn | Al | $V_{10}O_{28}^{-6}$ | —                      |
| Mn | Al | $Mo_7O_{24}^{-6}$   | —                      |
| Ni | Al | $V_{10}O_{28}^{-6}$ | —                      |
| Ni | Al | $Mo_7O_{24}^{-6}$   | —                      |

I claim:

1. The composition conforming to the formula $A_x^{++}B_y^{+++}(OH)_{2x+3y-nz}D_z^{n-} \cdot tH_2O$ wherein A is a divalent metal, B is a trivalent metal, D is at least one polyanion selected from the group consisting of $Ta_6O_{18}OH^{-7}$, $Nb_6O_{18}OH^{-7}$, $V_{10}O_{28}^{-6}$, $PMo_6V_6O_{40}^{-3}$, $PMo_6W_6O_{40}^{-3}$, $P_3O_{10}^{-5}$, $PMo_{12}O_{40}^{-3}$, $Mo_7O_{24}^{-6}$, $NiW_6O_{24}H_6^{-4}$, $As_2Mo_{18}O_{62}^{-6}$, $TeMo_6O_{24}^{-6}$, $PMo_{10}V_2O_{40}^{-5}$, $CoW_{12}O_{40}^{-6}$, $Pt_{18}(CO)_{36}^{-2}$, $Rh_6(CO)_{15}^{-2}$, $Re_3Cl_{12}^{-3}$, $Ni_3Cr(CO)_{16}^{-2}$, $H_3Ru_4(CO)_{12}^{-}$, $HRe_3(CO)_{12}^{-2}$, and $HFe_4(CO)_{13}^{-3}$, x, y, z and t are numbers greater than zero, and n is a whole number preferably from 1 to 10 and the ratio of x:y is equal to or greater than 0.5 and less than or equal to 10.

2. The composition of claim 1 wherein A is at least one member selected from the group consisting of copper, calcium, zinc, cobalt, iron, cadmium, mercury, lead, manganese, magnesium, tin, strontium, barium, nickel, platinum and palladium.

3. The composition of claim 2 wherein B is at least one member selected from the group consisting of aluminum, iron, antimony, indium, chromium, cobalt, lanthanum and other rare earths, ruthenium, rhodium and bismuth.

4. The composition of claim 3 wherein A is zinc, B is aluminum and D is $PMo_{12}O_{40}^{-6}$.

5. The composition of claim 3 wherein A is zinc, B is chromium and D is $PMo_{12}O_{40}^{-3}$.

6. The composition of claim 3 wherein A is zinc, B is aluminum and D is $V_{10}O_{28}^{-6}$.

7. The composition of claim 3 wherein A is nickel, B is aluminum and D is $Mo_7O_{24}^{-6}$.

8. The composition of claim 3 wherein A is zinc, B is bismuth and D is $Mo_7O_{24}^{-6}$.

9. The composition of claim 3 wherein A is zinc, B is aluminum and D is $CoW_{12}O_{40}^{-6}$.

10. The composition of claim 3 wherein A is copper, B is chromium and D is $V_{10}O_{28}^{-6}$.

11. The composition of claim 3 wherein A is calcium, B is aluminum and D is $PMo_6V_6O_{40}^{-5}$.

12. The process for preparing the composition conforming to the formula $A_x^{++}B_y^{+++}(OH)_{2x+3y-nz}D_z^{n-} \cdot tH_2O$ wherein A is a divalent metal, B is a trivalent metal, D is at least one polyanion selected from the group consisting of $Ta_6O_{18}OH^{-7}$, $Nb_6O_{18}OH^{-7}$, $V_{10}O_{28}^{-6}$, $PMo_6V_6O_{40}^{-3}$, $PMo_6W_6O_{40}^{-3}$, $P_3O_{10}^{-5}$, $PMo_{12}O_{40}^{-3}$, $Mo_7O_{24}^{-6}$, $NiW_6O_{24}H_6^{-4}$, $AsMo_{18}O_{62}^{-6}$, $TeMo_6O_{24}^{-6}$, $PMo_{10}V_2O_{40}^{-5}$, $CoW_{12}O_{40}^{-6}$, $Pt_{18}(CO)_{36}^{-2}$, $Rh_6(CO)_{15}^{-2}$, $ReCl_{12}^{-3}$, $Ni_3Cr(CO)_{16}^{-2}$, $H_3Ru_4(CO)_{12}<$, $HRe_3(CO)_{12}^{-2}$ and $HFe_4(CO)_{13}^{-}$, x, y, z and t are numbers greater than zero, and n is a whole number preferably of from 1 to 10 and the ratio of x:y is equal to our greater than 0.5 and less than or equal to 10 comprising slurrying a smectic material conforming to the formula $A_x^{++}B_y^{+++}(OH)_{2x+3y-nz}C_z^{n-} \cdot tH_2O$ wherein A, B, x, y, z, n and t have the foregoing designations and C is at least one anion selected from the group consisting of $NO_3^-$, $Cl^-$, $CO_3^{-2}$, and $SO_4^{-2}$ in water or a non-aqueous solvent which contains the dissolved polyanion and recovering the solid product.

13. The process of claim 12 wherein A is at least one member selected from the group consisting of copper, calcium, zinc, cobalt, iron, cadmium, mercury, lead, manganese, magnesium, tin, strontium, barium, nickel, platinum, and palladium.

14. The process of claim 13 wherein B is at least one member selected from the group consisting of aluminum, iron, antimony, indium, chromium, cobalt, lanthanum and other rare earths, ruthenium, rhodium and bismuth.

15. The process of claim 14 wherein A is zinc, B is aluminum and D is $PMo_{12}O_{40}^{-6}$.

16. The process of claim 14 wherein A is zinc, B is chromium and D is $PMo_{12}O_{40}^{-3}$.

17. The process of claim 14 wherein A is zinc, B is aluminum and D is $V_{10}O_{28}^{-6}$.

18. The process of claim 14 wherein A is nickel, B is aluminum and D is $Mo_7O_{24}^{-6}$.

* * * * *